United States Patent
Li et al.

(10) Patent No.: US 8,699,439 B2
(45) Date of Patent: Apr. 15, 2014

(54) METHOD AND SYSTEM FOR PAGING A TERMINAL IN MULTI-CARRIER SYSTEM

(75) Inventors: Nan Li, Shenzhen (CN); Ke Yao, Shenzhen (CN); Kaiying Lv, Shenzhen (CN); Yuqin Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 190 days.

(21) Appl. No.: 13/259,340

(22) PCT Filed: May 10, 2010

(86) PCT No.: PCT/CN2010/072556
§ 371 (c)(1),
(2), (4) Date: Nov. 2, 2011

(87) PCT Pub. No.: WO2010/130186
PCT Pub. Date: Nov. 18, 2010

(65) Prior Publication Data
US 2012/0051279 A1    Mar. 1, 2012

(30) Foreign Application Priority Data
May 11, 2009    (CN) .......................... 2009 1 0083763

(51) Int. Cl.
*H04W 4/00*    (2009.01)
(52) U.S. Cl.
USPC .......................................... 370/329; 370/349
(58) Field of Classification Search
USPC .................. 370/328, 338, 349, 389, 392, 329
See application file for complete search history.

(56) References Cited

U.S. PATENT DOCUMENTS

| | | | |
|---|---|---|---|
| 7,983,697 B2 | 7/2011 | Wu et al. | |
| 8,068,465 B2 * | 11/2011 | Zhang et al. | 370/335 |
| 8,149,814 B2 * | 4/2012 | Wang et al. | 370/347 |
| 8,265,006 B2 * | 9/2012 | Ahmadi et al. | 370/328 |
| 2009/0109890 A1 * | 4/2009 | Chow et al. | 370/312 |
| 2009/0180418 A1 | 7/2009 | Zhang et al. | |
| 2009/0268700 A1 * | 10/2009 | Son et al. | 370/336 |
| 2009/0274120 A1 * | 11/2009 | Chou | 370/331 |
| 2010/0271175 A1 * | 10/2010 | Chou et al. | 340/7.25 |
| 2011/0317777 A1 * | 12/2011 | Huang et al. | 375/259 |

FOREIGN PATENT DOCUMENTS

| | | |
|---|---|---|
| CN | 1980466 A | 6/2007 |
| CN | 101119504 A | 2/2008 |
| CN | 101155346 A | 4/2008 |
| CN | 101415147 A | 4/2009 |
| KR | 20090037702 A | 4/2009 |

* cited by examiner

*Primary Examiner* — Ricky Ngo
*Assistant Examiner* — Christine Ng
(74) *Attorney, Agent, or Firm* — Christopher L. Parmelee; Walker & Jocke (57) ABSTRACT

A method for paging a terminal in a multi-carrier system is disclosed in the present invention, and the method includes that: the terminal enters an Idle mode, and the system selects as a paging carrier for the terminal a fully configured carrier which a Multicast Broadcast Service (MBS) is sent on so as to send a paging message; the terminal receives MBS service on the carrier where the MBS service is sent, simultaneously receives the paging message on the paging carrier, and performs the corresponding operation according to the paging message. A system for paging a terminal in a multi-carrier system is also disclosed in the present invention. Based on the method and system, it is possible for the terminal to receive the paging message of the system efficiently and duly while receiving multicast broadcast service.

13 Claims, 4 Drawing Sheets

METHOD AND SYSTEM FOR PAGING A TERMINAL IN MULTI-CARRIER SYSTEM

FIELD OF THE INVENTION

The present invention relates to the technology for paging a terminal, especially a method and system for paging a terminal in a multi-carrier system.

DESCRIPTION OF THE RELATED ART

Broadband wireless access with Worldwide Interoperability for Microwave Access (WiMAX) technology is the broadband wireless technology based on the IEEE 802.16 standard for Metropolitan Area Network. The 802.16m system supports operations of multi-carriers, and the system can have one or multiple Fully Configured Carriers, which carry the information that includes all the control information of synchronization, broadcast, multicast and unicast in the system, as well as the information and parameters of operations of multi-carriers and other carriers; meanwhile, the system can also have one or multiple Partially Configured Carriers which are only used for downlink transmission, which carry the information corresponding to all the control channels that support the downlink transmission. In the above, a fully configured carrier can be used as the primary carrier or secondary carrier of the terminal, and a partially configured carrier can be used as the secondary carrier of the terminal.

The existing technologies specify two operation modes for accessing a multi-carrier system by a terminal, and the terminal can select a suitable operation mode as needed when it accesses the system.

Mode One, Carrier Aggregation: a terminal always maintains a physical connection with the primary carrier and monitors the control information sent on the primary carrier.

Mode Two, Carrier Switch: through the indication from a base station, a terminal can switch its physical connection with a primary carrier to an secondary carrier; after connecting with the secondary carrier, the terminal does not need to maintain the physical connection with the primary carrier, and it will return to establish a physical connection with the primary carrier after maintaining the connection with the secondary carrier for a certain period.

Multicast Broadcast Service (MBS) is a point-to-multipoint service, provided in a mobile network, of transmitting data by one data source to multiple users, which enables the sharing of network resources and improves the utility ratio of network resources. MBS service based on WiMAX supports two kinds of access modes: single base station access and multi base station access. Under the mode of multi base station access, the concept of MBS zone is defined, that is, the assembly of a group of base stations, each MBS zone corresponds to one MBS zone identifier (MBS zone ID). A base station can simultaneously belong to multiple MBS zones, each MBS zone being able to provide multiple MBS services. In existing WiMAX systems, multicast service is identified by a multicast connection identifier (Multicast CID).

The 802.16m system supports Enhanced-Multicast Broadcast Services (E-MBS), e.g. achieving the multicast and broadcast of high-speed multimedia services. Therefore, in the 802.16m system, multi-carrier and MBS can be combined with each other so as to meet the requirements of high throughput and high rate of data transmission. There are two kinds of manners for bearing MBS service on the multi-carrier: one is the manner of dedicated carrier, namely, MBS service monopolizes all the time-frequency resources on a certain carrier; the other is the manner of a mixed-carrier, namely, MBS service shares time-frequency resources on the carrier with unicast service. In the above, a dedicated carrier is generally a partially configured carrier, and a mixed-carrier is generally a fully configured carrier. When MBS service is sent in manner of a dedicated carrier or a mixed-carrier, the base station needs to notify the terminal the correspondence relationship between the multicast connection and the carriers which multicast connection is on.

Figure 1:
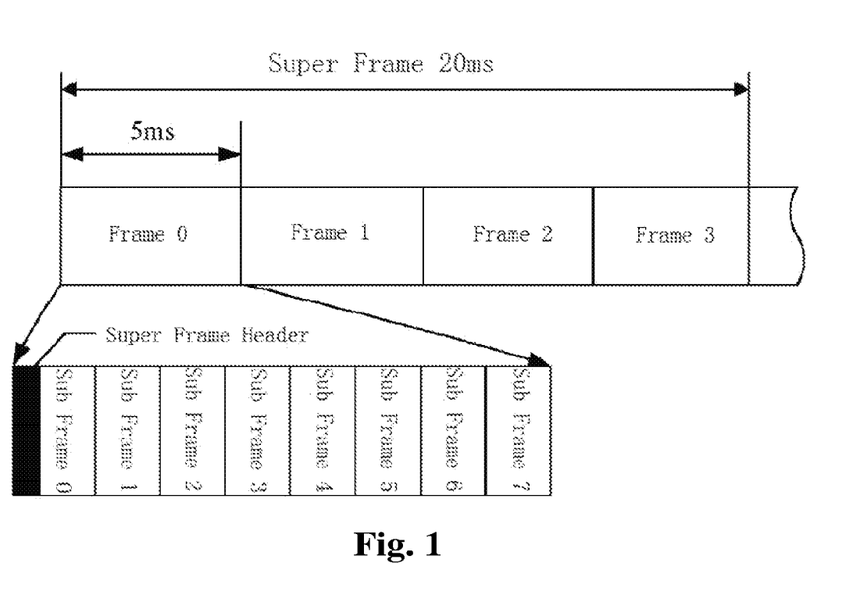
FIG. 1 is a structure diagram of the frame used in a multi-carrier system.

In the current 802.16m system, three layers of structures, that is Super Frame, Frame, and Sub Frame, are used in the frame structure design of carriers; as illustrated in FIG. 1, wireless resources are divided into Super Frames which is continuous on time, and the time length of each Super Frame is 20 milliseconds; each Super Frame consists of four Frames whose time length is 5 milliseconds; and each Frame comprises 8 Sub Frames. The first downlink sub frame of each super frame, i.e. Sub Frame 0, includes Super Frame Header; this Super Frame Header being used for transmitting the control information of the system broadcast. In the above, the control information of MBS service sent on the Super Frame Header and the control message of E-MBS indicated by the control information are used to control MBS service to be transmitted on the Super Frame.

The 802.16m system still provides an Idle mode so as to decrease power consumption of the terminal and reduce the utility of air interface resources. Multiple base stations that are geographically adjacent to each other are logically classified as one Paging Group; each paging group has a Paging Group Identifier (Paging Group ID), and a base station can simultaneously belong to multiple paging groups. Thus, each base station will store a Paging Group ID List of the paging group it belongs to. In the Idle Mode, a terminal is allowed not to switch the service base station when the terminal moves between different base stations. Entering the Idle mode, a terminal identifier, e.g., a temporal identifier, is allocated for the terminal, and the terminal works alternatively between Paging Listening Interval and Paging Unavailable Interval. The terminal receives broadcast information sent from a base station at the Paging Listening Interval. When the paging group where the base station locates broadcasts a paging message, the terminal analyzes the paging message at a predetermined position (location), determines whether the terminal is paged according to the temporal identifier in the paging message, and performs operations such as location update or network reentry, etc.

In a multi-carrier system, with regard to a terminal that works in manner of carrier switch, if the carrier that transmits a paging messages to the terminal and the carrier that transmits MBS service to the terminal are not the same, the terminal should receive the paging message and MBS service by continuously performing the switch between these two carriers, which undoubtedly increases the complexity of the operations of the terminal; meanwhile, the continuous switch performed by the terminal between the carriers also increases the overhead of the control signaling of the system. Therefore, with regard to a terminal that has performs paging after it has entered the Idle mode, especially with regard to a terminal that receives multicast broadcast service on one or multiple carriers, it is an urgent problem how the terminal can be ensured to simultaneously receive a paging message of the system efficiently and duly when the terminal receives MBS service.

SUMMARY OF THE INVENTION

In view of that, the main purpose of this invention is to provide a method and system for paging a terminal in a multi-carrier system, which enables that the terminal can simultaneously receive a paging message of the system efficiently and duly when receiving the MBS service.

To achieve the above mentioned purpose, the technical solution of this invention is realized as follows:

The present invention provides a method for paging a terminal in a multi-carrier system, and this method includes that: after the terminal enters an Idle mode, selecting as a paging carrier for the terminal by a system a fully configured carrier, which a multicast broadcast service, i.e., MBS service is sent on, so as to send a paging message; and receiving by the terminal the paging message on the paging carrier, and executing by the terminal the corresponding operation on the paging carrier according to the paging message.

In the above, the step of selecting as a paging carrier for the terminal by the system a fully configured carrier which the MBS service is sent on so as to send a paging message comprises: when the terminal works in manner of carrier aggregation or carrier switch, and receives multicast broadcast MBS service on one/multiple mixed-carriers or on one/multiple mixed-carriers and one/multiple dedicated carriers, selecting as a paging carrier by the system one from the mixed-carriers, which the MBS service is sent on, as desired so as to send a paging message.

In the above, the step of selecting as a paging carrier for the terminal by a system a fully configured carrier which the MBS service is sent on so as to send a paging message comprises: when the terminal works in manner of carrier aggregation and receives MBS service only on one/multiple dedicated carriers, selecting as a paging carrier by the system one from current primary carrier and other fully configured carriers that the system allocates for said terminal as desired so as to send a paging message.

In the above, the step of selecting as a paging carrier for the terminal by a system a fully configured carrier which the MBS service is sent on so as to send a paging message comprises: when the terminal works in manner of carrier switch and receives MBS service only on one/multiple dedicated carriers, selecting as a paging carrier one from current primary carrier and other fully configured carriers that the system allocates for the terminal as desired so as to send a paging message; and further selecting as desired one from the dedicated carriers which the MBS service is sent on so as to send a paging message.

In the above, the mixed-carrier and the primary carrier are fully configured carriers; the dedicated carrier is a partially configured carrier.

In the above, when the terminal works in manner of carrier switch and receives MBS service only on one/multiple dedicated carriers, the method further includes: generating the paging message to be sent on the dedicated carrier which the MBS service is sent on according to the paging message sent on the paging carrier; receiving by the terminal the paging message at the dedicated carrier which the MBS service is sent on; and in the information included in the paging message sent on the dedicated carrier which the MBS service is sent on, at least identifier information of the terminal and operation information that the terminal needs to execute are the same as identifier information of the terminal and operation information that the terminal needs to execute in the paging message sent on the paging carrier.

In the above, the identifier information is the calculated values of media access control address (MAC) of the terminal or is a temporal identifier that the system allocates for the terminal after the terminal enters an Idle mode; and the operation information that the terminal needs to execute is indicated by operation fields in the paging message.

In the above, the step of executing the corresponding operation at the paging carrier according to the paging message comprises: executing by the terminal operations characterized by the meaning corresponding to the operation fields at the paging carrier according to the values of the operation fields in the paging message.

In the above, the operations characterized by the meaning corresponding to the operation fields at least include one of the following: not executing any operation, updating location and reentering network.

In the above, the step of receiving by the terminal the paging message at the paging carrier comprises: when the terminal determines that a paging group the terminal belongs to has not changed according to a paging group ID list carried in a super frame header of the paging carrier, further determining that the paging group which the terminal belongs to has performed the broadcast of the paging message according to the indication information carried in the super frame header, and receiving the paging message at the paging carrier at a predetermined position according to the indication formation.

In the above, the method further includes: performing by the terminal the synchronization of system information according to the system information carried in the super frame header.

The present invention provides a paging system for paging a terminal in a multi-carrier system, the paging system comprising: carrier configuring module, configured to select as a paging carrier for a terminal a fully configured carrier which the MBS service is sent on, after the terminal enters an Idle mode; message generating module, configured to generate a paging message and send the paging message at the paging carrier; message receiving module, configured to receive the paging message sent on the paging carrier; and operation executing module, configured to execute corresponding operation at the paging carrier according to the paging message.

The system of this invention selects a fully configured carrier, which the MBS service is sent on, as a paging carrier for the terminal, so that the terminal can receive a paging message without switching carriers when receiving MBS service, reducing related signaling overhead of the system when the terminal receives a paging message.

More specifically, the paging carrier is selected for the terminal according to different working manners and working carriers of the terminal, which comprises: with regard to a terminal that works in manner of carrier aggregation or carrier switch and receives the MBS service on one/multiple mixed-carrier, or, one/multiple mixed-carrier and one/multiple dedicated carrier, the system selects one from the mixed-carriers where the terminal works as a paging carrier of the terminal according to needs; with regard to a terminal that works in manner of carrier aggregation and receives the MBS service on one/multiple dedicated carriers, the system selects one from the fully configured carriers where the terminal works as a paging carrier of the terminal; with regard to a terminal that works in manner of carrier switch and receives MBS service only on the dedicated carriers, the system selects a fully configured carrier as a paging carrier for the terminal, and further sends a paging message comprising identifier information of this terminal on the dedicated carrier where the terminal receives MBS service. In this way, the terminal can receive a paging message and perform paging without switching between carriers when the terminal receives MBS service, therefore simplifying the operating procedure of receiving by a terminal a paging message and also reducing the overhead of related signaling of the system when the terminal receives the paging message, so that the terminal can simultaneously receive a paging message of the system efficiently and duly when receiving MBS service.

DETAILED DESCRIPTION OF THE EMBODIMENTS

The following is a further detailed description of the technical solution of this invention with reference to the Drawings and specific embodiments.

Figure 2:
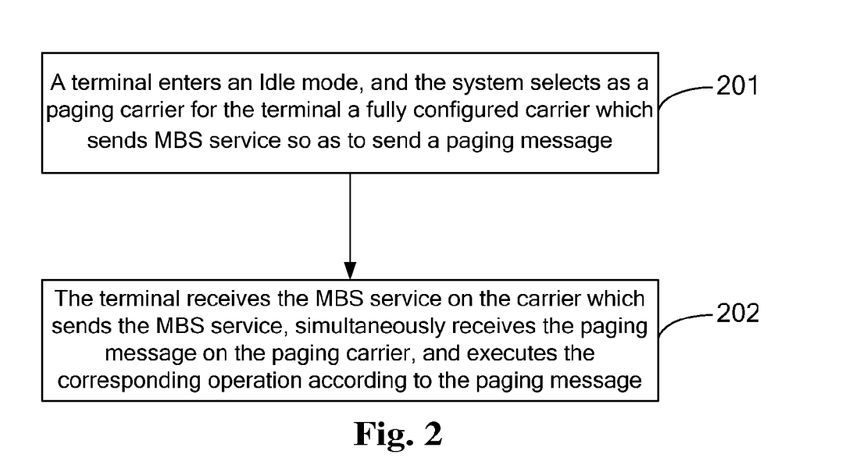
FIG. 2 is a flowchart of the method for paging a terminal in a multi-carrier system of this invention.

The method for paging a terminal in a multi-carrier system of this invention is as illustrated in FIG. 2, wherein the procedure thereof includes:

Step 201: A terminal enters an Idle mode, and the system (for example, a base station or a paging controller at the network side) selects as a paging carrier for the terminal a fully configured carrier which the MBS service is sent on so as to send a paging message.

In this invention, the fully configured carrier for sending a paging message is called as a paging carrier. In the above, a paging message contains the identifier information of this terminal for uniformly identifying the terminal in one paging group. Specifically, the identifier information can be the calculated values of the Media Access Control (MAC) address of the terminal; after the terminal enters an Idle mode, preferably, the identifier information can also be a temporal identifier, allocated by the system, of the terminal. Of course, the identifier information can also be other information that enables to uniformly identify the terminal in one paging group. The base station needs to store the identifier information of each terminal in a paging group as well as the carrier physical frequency point or carrier identifier information of the corresponding paging carrier.

Two cases exist when the system selects a paging carrier for the current terminal:

1. The terminal works in manner of carrier aggregation. If a terminal receives the MBS service on one/multiple mixed-carriers, or, one/multiple mixed-carriers and one/multiple dedicated carriers, preferably, the system selects one from the mixed-carriers, which the MBS service is sent on, as a paging carrier for the terminal according to needs, so as to send a paging message which carries the identifier information of this terminal. In such case, the paging carrier and one of the mixed-carriers for sending the MBS service is the same carrier.

If a terminal receives the MBS service only on one/multiple dedicated carriers, the system selects one from the primary carrier and other fully configured carriers allocated for the terminal by the system as a paging carrier according to needs. In such case, the paging carrier and the dedicated carrier for sending MBS service are not the same carrier. Since the terminal that works in manner of carrier aggregation can work on multiple carriers simultaneously, therefore in such case, the terminal can simultaneously receive the MBS service and the paging message without performing the switching between the paging carrier and the dedicated carrier for sending MBS service.

2. The terminal works in manner of carrier switch. If a terminal receives the MBS service on one/multiple mixed-carriers, or, one/multiple mixed-carriers and one/multiple dedicated carriers, in such case, the way for selecting a paging carrier is the same as those described above for the situation that a terminal works in manner of carrier aggregation, so it will not be described herein redundantly.

The working manner of the above mentioned terminal is a working manner determined during the capability negotiation between the terminal and the base station when the network is accessed.

If a terminal receives the MBS service only on one/multiple dedicated carriers, the system selects one from the primary carrier and other fully configured carriers allocated for the terminal by the system as a paging carrier according to needs, and further select one from the dedicated carriers, which the MBS service is sent on, for sending a paging message. The paging message sent on the paging carrier is called as Paging Message One, and the paging message sent on the dedicated carrier which the MBS service is sent on is called as Paging Message Two, wherein the Paging Message Two is generated according to Paging Message One, at least the identifier information of the terminal and the operation information that the terminal needs to execute are the same in the information contained in the two messages. In the above, the operation information can be indicated through operation fields, and the terminal executes operations characterized by the meaning corresponding to values of operation fields according to the values of operation fields, which comprises: updating location, reentering the network or not executing any operation by the terminal, etc. Of course, the terminal can also execute other operations according to actual values of the operation fields.

In such case, the paging carrier and the dedicated carrier for sending the MBS service are not the same carrier. Since the terminal that works in manner of carrier switch can just work on one carrier at one time, this invention generates Paging Message Two according to Paging Message One, and sends Paging Message Two on the dedicated carrier which the MBS service is sent on, so that the terminal can receive the paging message simultaneously without switching carriers when receiving MBS service.

Step 202: The terminal receives the MBS service on the carrier which the MBS service is sent on, simultaneously receives the paging message on the paging carrier, and executes the corresponding operation according to the paging message. Current procedure ends.

The terminal receives the MBS service according to the control information of MBS service carried in Super Frame Header, which is related art and is not described redundantly.

The system of this embodiment selects a fully configured carrier which the MBS service is sent on as a paging carrier for the terminal, so that the terminal can receive a paging message without switching carriers when receiving MBS service, reducing the overhead of related signaling of the system when the terminal receives the paging message.

The procedure that a terminal simultaneously receives a paging message when receiving MBS service will be illustrated with reference to the following embodiments.

The working status of a terminal after it enters an Idle mode can be divided into Paging Listening Interval and Paging Unavailable Interval based on time, i.e. the terminal will work alternatively between Paging Listening Interval and Paging Unavailable Interval according to the paging parameter allocated by the base station after the terminal enters an Idle mode. Paging parameters specify the length, starting time and/or end time of Paging Listening Interval as well as the length, starting time and/or end time of Paging Unavailable Interval. Assuming a terminal works on Carrier 1, it can be known according to the paging parameters that the Paging Listening Interval of the terminal starts from the second Super Frame and the length is 60 ms (the length of three Super Frames), that is, the Paging Listening Interval of the terminal ends at the end of the fourth Super Frame; after the Paging Listening Interval ends, the terminal immediately enters the Paging Unavailable Interval, whose length is 40 ms (the length of two Super Frames). In the above, the terminal continuously performs listening during the Paging Listening Interval and receives the data sent on the carrier during the Paging Listening Interval; when the terminal is at the Paging Unavailable Interval, it will not start to receive data until the arrival of MBS service data. After having finished receiving the data, the terminal returns to the Paging Unavailable Interval immediately; if MBS service data arrives again, the terminal will perform the receiving again; if there is no MBS service data during the Paging Unavailable Interval, the terminal will maintain the paging unavailable status until the end of Paging Unavailable Interval. The terminal works alternatively between Paging Listening Interval and Paging Unavailable Interval, so that power consumption of the terminal can be reduced.

Figure 3:
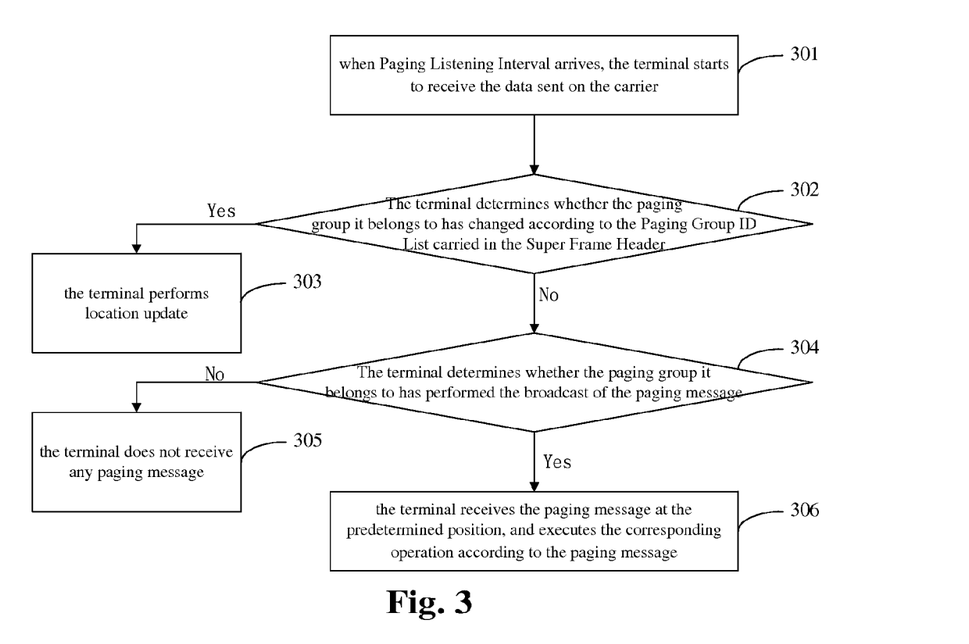
FIG. 3 is a flowchart of receiving by a terminal a paging message according to this invention.

By taking the mixed-carrier as the paging carrier for example, the procedure that the terminal simultaneously receives a paging message when receiving MBS service is described, which is as shown in FIG. 3 and comprises:

Step 301: when Paging Listening Interval arrives, the terminal starts to receive the data sent on the carrier.

When the Paging Listening Interval arrives, the terminal receives data on the carrier where it works, for example, wherein the data comprises MBS service data and downlink data such as MBS service control information, E-MBS control information, paging messages, system information and broadcast information; in the above, MBS service control information, system information and broadcast information can be sent through Super Frame Header, and the paging message can be sent as a message element of E-MBS control message or can be sent as a separate broadcast message. When the terminal enters Paging Unavailable Interval, it does not receive any other downlink data except MBS service data.

Step 302~303: The terminal determines whether the paging group it belongs to has changed according to the Paging Group ID List carried in the Super Frame Header; if Yes, Step 303 is executed, and the terminal performs location update; if No, Step 304 is executed.

When the terminal accesses a base station, it will receive and store a Paging Group ID List, which the base station belongs to, sent from the base station. When the terminal receives the Paging Group ID List carried in the Super Frame Header during Paging Listening Interval, it will compare the Paging Group ID List it has stored with currently received Paging Group ID List, so that the terminal will know whether the paging group it belongs to has changed; if changed, the terminal will perform location update. After the location update is executed, if the corresponding relationship between the multicast connection of the terminal and the carrier where the terminal locates has changed, the base station will select a paging carrier again for the terminal according to current location of the terminal. For example, Base Station a belongs to Paging Group 1 and Paging Group 2, the paging groups of all the terminals that access Base Station a are Paging Group 1 and Paging Group 2. If the Paging Group ID List carried in the Super Frame Header that the terminal currently receives is Paging Group 3 and Paging Group 4, it means that the paging group that the terminal belongs to has changed, and then the terminal will perform location update. After the location update is executed, the corresponding relationship between multicast connection of the terminal and the carrier where the terminal locates has changed, the base station will select a paging carrier for the terminal again. The method for selecting a paging carrier again is the same as above described in Step 201, which will not be described redundantly herein.

Step 304~305: The terminal determines whether the paging group it belongs to has performed the broadcast of the paging message; if No, Step 305 is executed, the terminal does not receive any paging message, and the procedure ends; if Yes, Step 306 is executed.

Generally, Super Frame Header carries system information which contains the indication information of indicating whether the paging group that the terminal belongs to has performed the broadcast of the paging message; if the indication information indicates that the paging group that the terminal belongs to has performed the broadcast of the paging message, then the indication also indicates the moment when the paging message is sent on the carrier, i.e. the position where the terminal receives the paging message on the carrier, and this position is the predetermined position where the terminal receives the paging message. This predetermined position varies depending on different specific situations.

If the indication information indicates that the paging group that the terminal belongs to has not performed the broadcast of the paging message, the terminal does not receive the paging message.

Step 306: the terminal receives the paging message at the predetermined position, and executes the corresponding operation according to the paging message.

Herein the terminal receives the paging message at the predetermined position on the paging carrier according to the above mentioned indication information, and executes the operations characterized by the meaning corresponding to the operation fields on the paging carrier. The operations that the terminal executes include: not executing any operation, updating location, and reentering network by the terminal, etc.; of course, the terminal can also execute other operations according to the actual values of the operation fields.

It needs to be noted that, with regard to the terminal that works in manner of carrier switch and only receives MBS service on the dedicated carrier, the terminal receives Paging Message Two on the dedicated carrier which the MBS service is sent on; however, the above mentioned operations, that the terminal executes, characterized by the meaning corresponding to the operation fields should be switched to the paging carrier to be executed. With regard to the terminal that works in manner of carrier aggregation as well as the terminal that works in manner of carrier switch and receives MBS service on one/multiple mixed-carriers, or, on one/multiple mixed-carriers and one/multiple dedicated carriers, the paging carrier thereof is one of the mixed-carriers where it works, and the terminal receives the paging message on the mixed-carrier, so that the above mentioned operations performed according to the characterized meaning corresponding to the operation fields can be executed directly on the mixed-carrier without switching carriers.

In addition, the terminal still needs to perform the synchronization of system information during the listening intervals: the terminal performs the synchronization of the corresponding information it stores according to the system information received during the listening intervals. If the terminal does not complete the synchronization of all the system information during the Paging Listening Interval specified by the paging parameters, the terminal will remain in the Paging Listening Interval until the synchronization of all the system information is completed, and then it will enter Paging Unavailable Interval.

The following is the description of the method of the present invention with reference to specific embodiments.

Figure 4:
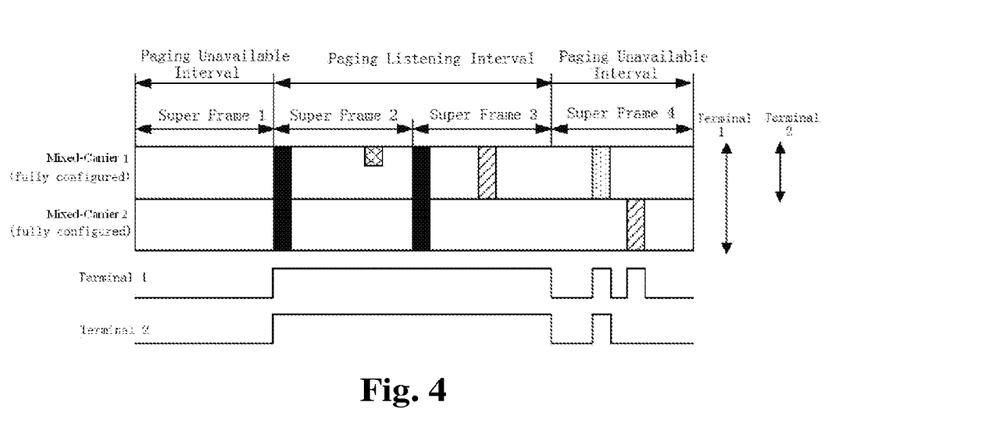
FIG. 4 is a schematic diagram of Embodiment I of the method for paging a terminal according to this invention.

The method for paging a terminal that works in manner of carrier aggregation or carrier switch, and receives MBS service on one/multiple mixed-carriers as well as one/multiple mixed-carriers and one/multiple dedicated carriers is as shown in FIG. 4, wherein the parts filled with black refer to the Super Frame Header of Super Frame in a paging interval, the parts filled with mesh refer to the paging message, the parts filled with twill refer to MBS Service One, and the parts filled with dot refer to MBS Service Two. In the embodiment, assuming Terminal 1 and Terminal 2 are terminals that work in manner of carrier aggregation and have already entered an Idle mode, furthermore, these two terminals belong to one paging group, and the Paging Listening Interval and Paging Unavailable Interval of them are the same. In the above, Terminal 1 receives MBS Service Two on mixed-carrier 1 and MBS Service One on mixed-carrier 2, and Terminal 2 receives MBS Service Two on mixed-carrier 1, i.e. Terminal 1 works on mixed-carrier 1 and mixed-carrier 2, and Terminal 2 works on mixed-carrier 1; therefore, the system selects mixed-carrier 1 for Terminal 1 and Terminal 2 as their common paging carrier for sending a paging message. It needs to be noted that, this paging message includes the indication information corresponding to Terminal 1 and Terminal 2, as well as the operation information, e.g. operation fields that Terminal 1 and Terminal 2 respectively need to execute.

When Paging Listening Interval arrives, both Terminal 1 and Terminal 2 begin to receive Super Frame Header on the carrier where they work and perform the synchronization of system information, for example, Terminal 1 simultaneously receives the Super Frame Headers of mixed-carrier 1 and mixed-carrier 2, and Terminal 2 receives the Super Frame Header of mixed-carrier 1; meanwhile, when the terminal detects that the paging group it locates performs the broadcast of a paging message, it receives the paging message at the predetermined position. If the operation fields of the paging message indicate that the terminal needs to perform operations of updating location or reentering the network, the operations that Terminal 1 and Terminal 2 perform will be performed on mixed-carrier 1, i.e. on the paging carrier. When Paging Listening Interval ends, Terminal 1 and Terminal 2 enter Paging Unavailable Interval.

While Terminal 1 and Terminal 2 perform the synchronization of system information and receive the paging message, they also receive MBS service respectively on corresponding carriers according to the MBS service control information in the Super Frame Header, for example, Terminal 1 receives MBS Service Two on mixed-carrier 1 and MBS Service One on mixed-carrier 2, and Terminal 2 receives MBS Service Two on mixed-carrier 1. During the Paging Unavailable Interval, if there are still MBS service that Terminal 1 and terminal 2 respectively hope to receive, Terminal 1 and Terminal 2 receive such MBS service at corresponding moments and return to the Paging Unavailable Interval status after having received such MBS service.

Of course, Terminal 1 and Terminal 2 may also belong to different paging groups. In such case, their Paging Listening Intervals and Paging Unavailable Intervals are different, and Terminal 1 and Terminal 2 respectively receive the data sent on the carriers according to their own Paging Listening Interval and Paging Unavailable Interval, and perform the corresponding operations.

Figure 5:
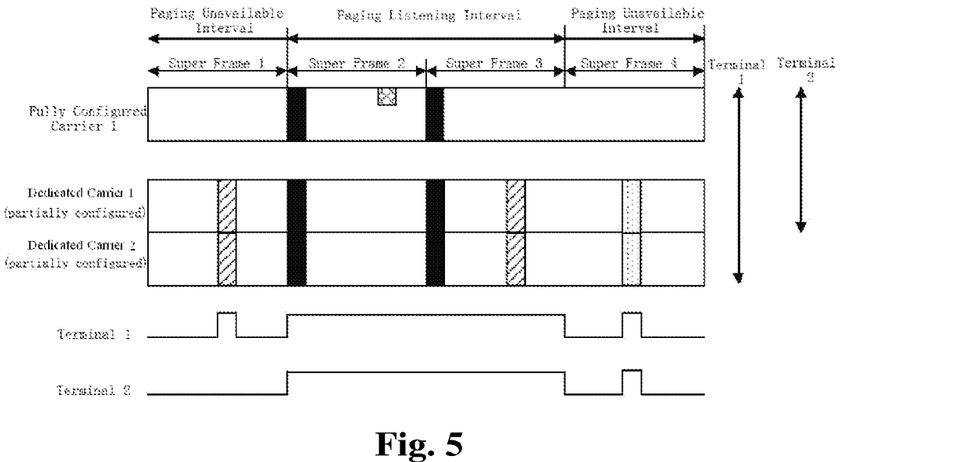
FIG. 5 is a schematic diagram of Embodiment II of the method for paging a terminal according to this invention.

The method for paging a terminal that works in manner of carrier aggregation and receives MBS service only on one/multiple dedicated carriers is as illustrated in FIG. 5, wherein the parts filled with black refer to the Super Frame Header of the Super Frame in the paging interval, the parts filled with mesh refer to the paging message, the parts filled with twill refer MBS Service One, and the parts filled with dot refer to MBS Service Two. In the embodiment, assuming Terminal 1 and Terminal 2 belong to the same paging group, Terminal 1 receives MBS Service One on Dedicated Carrier 1 and MBS Service Two on Dedicated Carrier 2, and Terminal 2 only receives MBS Service Two on Dedicated Carrier 2, and then the system selects Fully Configured Carrier 1 for Terminal 1 and Terminal 2 as their common paging carrier according to needs. Since Terminal 1 and Terminal 2 work in manner of carrier aggregation and can work on multiple carriers simultaneously, Terminal 1 and Terminal 2 can receive the paging message on Fully Configured Carrier 1, i.e. the paging carrier while receiving MBS service on corresponding dedicated carriers. If the operation fields of the paging message indicate that the terminal needs to perform operations of updating location or reentering network, such operations that Terminal 1 and Terminal 2 perform are performed on Fully Configured Carrier 1, i.e. the paging carrier.

Of course, Terminal 1 and Terminal 2 can also belong to different paging groups. In such case, their Paging Listening Intervals and Paging Unavailable Intervals are different, and Terminal 1 and Terminal 2 respectively receive the data sent on carriers according to their own Paging Listening Intervals and Paging Unavailable Intervals, and perform the corresponding operations.

Figure 6:
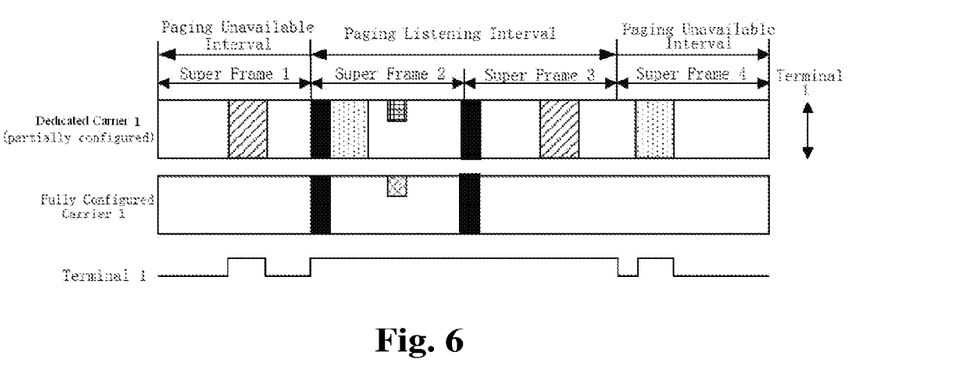
FIG. 6 is a schematic diagram of Embodiment III of the method for paging a terminal according to this invention.

The method for paging a terminal that works in manner of carrier switch and receives MBS service only on one/multiple dedicated carriers is as illustrated in FIG. 6, wherein the parts filled with black refer to the Super Frame Header of the Super Frame in the paging interval, the parts filled with mesh refer Paging Message One, the parts filled with grid refer to Paging Message Two, the parts filled with twill refer to MBS Service One, and the parts filled with dot refer to MBS Service Two. In this embodiment, assuming Terminal 1 works on Dedicated Carrier 1, and receives MBS Service One and MBS Service Two sent on the Dedicated Carrier 1; the system selects Fully Configured Carrier 1 as the paging carrier for Terminal 1 according to needs, wherein the Fully Configured Carrier 1 is used to send Paging Message One. When the paging group where Terminal 1 locates has performed the broadcast of the paging message which is Paging Message One sent on the Fully Configured Carrier 1, the system generates Paging Message Two according to this Paging Message One and sends the Paging Message Two on the Dedicated Carrier 1. Thus, Terminal 1 receives the MBS service as well as the paging message on the Dedicated Carrier 1. However, Terminal 1 should switch to the Fully Configured Carrier 1 for performing the corresponding operations according to the operation fields of Paging Message Two.

Figure 7:
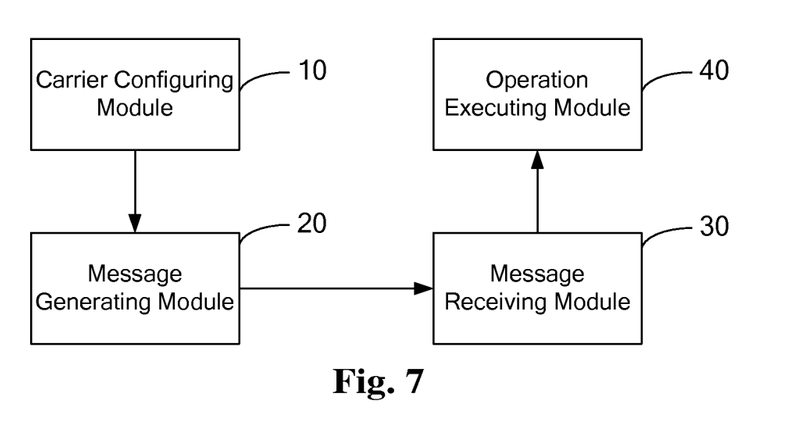
FIG. 7 is a structure diagram of the system for paging a terminal in a multi-carrier system of this invention.

To achieve the above mentioned method for paging a terminal, this invention further provides a system for paging a terminal. As shown in FIG. 7, this system comprises: Carrier Configuring Module 10, Message Generating Module 20, Message Receiving Module 30, and Operation Executing Module 40; wherein, Carrier Configuring Module 10 is used for selecting as a paging carrier for the terminal a fully configured carrier, which the MBS service is sent on, after the terminal enters an Idle mode;

Message Generating Module 20 is used for generating a paging message and sending it on the paging carrier;

Message Receiving Module 30 is used for receiving the paging message sent on the paging carrier;

Operation Executing Module 40 is used for performing the corresponding operation on the paging carrier according to the paging message.

Obviously, those skilled in the art should understand that each module or each step of this invention mentioned above can be realized through general computing devices; they can be integrated on a single computing device, or distributed on the network consisting of multiple computing devices; alternatively, they can be realized through programming codes that computing devices can execute, so that they can be stored in storage devices to be executed by computing devices, and in some cases, the steps illustrated or described herein can be carried out in a different order from the order herein, or they can be formed separately as each single integrated circuit module, or multiple modules or steps of them can be formed as each single integrated circuit module. Thus, the present invention is not limited to any combination of certain hardware and software.

What is described above is only preferred embodiments of this invention, and they shall not be used for limiting the protection scope of this invention.

What is claimed is:

1. A method for paging a terminal in a multi-carrier system, comprising:
    after the terminal enters an Idle mode, selecting as a paging carrier for the terminal by a system a fully configured carrier, which a multicast broadcast service, MBS service, is sent on, so as to send a paging message; and
    receiving by the terminal the paging message on the paging carrier, and executing by the terminal the corresponding operation on the paging carrier according to the paging message;
    wherein when the terminal works in manner of carrier switch and receives MBS service only on one/multiple dedicated carriers, the method further includes:
    generating the paging message to be sent on the dedicated carrier which the MBS service is sent on according to the paging message sent on the paging carrier;
    receiving by the terminal the paging message at the dedicated carrier which the MBS service is sent on; and
    in the information included in the paging message sent on the dedicated carrier which the MBS service is sent on, at least identifier information of the terminal and operation information that the terminal needs to execute are the same as identifier information of the terminal and operation information that the terminal needs to execute in the paging message sent on the paging carrier.

2. The method for paging a terminal in a multi-carrier system according to claim 1, wherein the step of selecting as a paging carrier for the terminal by a system a fully configured carrier which the MBS service is sent on so as to send a paging message comprises:
    when the terminal works in manner of carrier aggregation or carrier switch, and receives multicast broadcast MBS service on one/multiple mixed-carriers or on one/multiple mixed-carriers and one/multiple dedicated carriers, selecting as a paging carrier by the system one from the mixed-carriers, which the MBS service is sent on, as desired so as to send a paging message.

3. The method for paging a terminal in a multi-carrier system according to claim 2, wherein the mixed-carrier and a primary carrier are fully configured carriers; the dedicated carrier is a partially configured carrier.

4. The method for paging a terminal in a multi-carrier system according to claim 1, wherein the step of selecting as a paging carrier for the terminal by a system a fully configured carrier which the MBS service is sent on so as to send a paging message comprises:
    when the terminal works in manner of carrier aggregation and receives MBS service only on one/multiple dedicated carriers, selecting as a paging carrier by the system one from current primary carrier and other fully configured carriers that the system allocates for said terminal as desired so as to send a paging message.

5. The method for paging a terminal in a multi-carrier system according to claim 4, wherein the mixed-carrier and the primary carrier are fully configured carriers; the dedicated carrier is a partially configured carrier.

6. The method for paging a terminal in a multi-carrier system according to claim 1, wherein the step of selecting as a paging carrier for the terminal by a system a fully configured carrier which the MBS service is sent on so as to send a paging message comprises:
    when the terminal works in manner of carrier switch and receives MBS service only on one/multiple dedicated carriers, selecting as a paging carrier one from current primary carrier and other fully configured carriers that the system allocates for the terminal as desired so as to send the paging message; and further selecting as desired one from the dedicated carriers which the MBS service is sent on so as to send the paging message.

7. The method for paging a terminal in a multi-carrier system according to claim 6, wherein the mixed-carrier and the primary carrier are fully configured carriers; the dedicated carrier is a partially configured carrier.

8. The method for paging a terminal in a multi-carrier system according to claim 1, wherein
    the identifier information is the calculated values of media access control address (MAC) of the terminal or is a temporal identifier that the system allocates for the terminal after the terminal enters an Idle mode; and
    the operation information that the terminal needs to execute is indicated by operation fields in the paging message.

9. The method for paging a terminal in a multi-carrier terminal according to claim 8, wherein the step of executing the corresponding operation at the paging carrier according to the paging message comprises:
    executing, by the terminal, operations characterized by the meaning corresponding to the operation fields at the paging carrier according to the values of the operation fields in the paging message.

10. The method for paging a terminal in a multi-carrier system according to claim 9, wherein the operations characterized by the meaning corresponding to the operation fields at least include one of the following: not executing any operation, updating location and reentering network.

11. The method for paging a terminal in a multi-carrier terminal according to claim 10, wherein the step of receiving by the terminal the paging message at the paging carrier comprises:

when the terminal determines that a paging group the terminal belongs to has not changed according to a paging group ID list carried in a super frame header of the paging carrier, further determining that the paging group which the terminal belongs to has performed the broadcast of the paging message according to the indication information carried in the super frame header, and receiving the paging message at the paging carrier at a predetermined position according to the indication formation.

12. The method for paging a terminal in a multi-carrier system according to claim 11, wherein the method further includes: performing by the terminal the synchronization of system information according to the system information carried in the super frame header.

13. A paging system for paging a terminal in a multi-carrier system, comprising:

carrier configuring module, configured to select as a paging carrier for a terminal a fully configured carrier which a MBS service is sent on, after the terminal enters an Idle mode;

message generating module, configured to generate a paging message and send the paging message at the paging carrier;

message receiving module, configured to receive the paging message sent on the paging carrier; and operation executing module, configured to execute corresponding operation at the paging carrier according to the paging message;

wherein when the terminal works in manner of carrier switch and receives MBS service only on one/multiple dedicated carriers, the message generating module is further configured to generate the paging message to be sent on the dedicated carrier which the MBS service is sent on according to the paging message sent on the paging carrier; the message receiving module is further configured to receive the paging message at the dedicated carrier which the MBS service is sent on; and in the information included in the paging message sent on the dedicated carrier which the MBS service is sent on, at least identifier information of the terminal and operation information that the terminal needs to execute are the same as identifier information of the terminal and operation information that the terminal needs to execute in the paging message sent on the paging carrier.

* * * * *